(12) United States Patent
Takeuchi et al.

(10) Patent No.: US 12,109,711 B2
(45) Date of Patent: Oct. 8, 2024

(54) METHOD OF SUPPORTING CREATION OF PROGRAM, PROGRAM CREATION SUPPORTING APPARATUS, AND STORAGE MEDIUM

(71) Applicant: SEIKO EPSON CORPORATION, Tokyo (JP)

(72) Inventors: Kaoru Takeuchi, Azumino (JP); Hiroki Adachi, Yokohama (JP); Hirofumi Kinoshita, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 347 days.

(21) Appl. No.: 17/553,853

(22) Filed: Dec. 17, 2021

(65) Prior Publication Data
US 2022/0193910 A1 Jun. 23, 2022

(30) Foreign Application Priority Data
Dec. 21, 2020 (JP) .................................. 2020-211188

(51) Int. Cl.
*B25J 9/16* (2006.01)
*G06F 8/34* (2018.01)

(52) U.S. Cl.
CPC ........... *B25J 9/1671* (2013.01); *B25J 9/1661* (2013.01); *G06F 8/34* (2013.01)

(58) Field of Classification Search
CPC .......... B25J 9/1671; B25J 9/1661; G06F 8/34
See application file for complete search history.

(56) References Cited

U.S. PATENT DOCUMENTS

| 2002/0038168 | A1  | 3/2002  | Kasuga et al. |
|---|---|---|---|
| 2004/0225416 | A1* | 11/2004 | Kubota ..................... G06F 8/34 701/1 |
| 2014/0188281 | A1  | 7/2014  | Nagai et al. |
| 2019/0051049 | A1* | 2/2019  | Shimakawa ........ G06F 9/45508 |
| 2019/0232492 | A1  | 8/2019  | Takeuchi |
| 2020/0384645 | A1* | 12/2020 | Griffiths ................. B25J 9/1664 |
| 2021/0170603 | A1* | 6/2021  | Kotlarski ............... B25J 13/006 |
| 2022/0258335 | A1* | 8/2022  | Schmitt .................. B25J 9/1676 |
| 2023/0080565 | A1* | 3/2023  | Ogawa ..................... B25J 9/163 700/245 |

FOREIGN PATENT DOCUMENTS

| JP | S58105303 A  | 6/1983  |
|---|---|---|
| JP | 2001353678 A | 12/2001 |
| JP | 2014233814 A | 12/2014 |
| JP | 2019126894 A | 8/2019  |
| JP | 2020181270 A | 11/2020 |

\* cited by examiner

*Primary Examiner* — Behrang Badii
*Assistant Examiner* — Jay Khandpur
(74) *Attorney, Agent, or Firm* — Samson G. Yu (57) ABSTRACT

A method of supporting creation of a program for supporting creation of a program for work by a robot, includes detecting an operation by a user on an input device, determining a type of the work by the operation to select the type, displaying a dedicated motion flow showing a sequence of motion of the robot corresponding to the type and containing a dedicated object showing the motion for which a change of the sequence is not allowed on a display device, and converting the dedicated object into a versatile object showing the motion for which a change of the sequence is allowed by the operation to convert the dedicated object.

7 Claims, 8 Drawing Sheets

| DEDICATED MOTION FLOW | DEDICATED OBJECT | VERSATILE OBJECT |
|---|---|---|
| ATTACHMENT SEQUENCE | ATTACHMENT OBJECT | PRESSING OBJECT |
| SCREWING SEQUENCE | SCREWING OBJECT | PRESSING MOVEMENT OBJECT |
| | RESCREWING OBJECT | PRESSING OBJECT |
| | | PRESSING MOVEMENT OBJECT |
| HEIGHT CHECK SEQUENCE | HEIGHT CHECK OBJECT | CONTACT OBJECT |
| FITTING SEQUENCE | INSERTION OBJECT | PRESSING MOVEMENT OBJECT |
| | | PRESSING OBJECT |
| | TENSILE TEST OBJECT | PRESSING OBJECT |

METHOD OF SUPPORTING CREATION OF PROGRAM, PROGRAM CREATION SUPPORTING APPARATUS, AND STORAGE MEDIUM

The present application is based on, and claims priority from JP Application Serial Number 2020-211188, filed Dec. 21, 2020, the disclosure of which is hereby incorporated by reference herein in its entirety.

BACKGROUND

1. Technical Field

The present disclosure relates to a method of supporting creation of a program, a program creation supporting apparatus, a program creation supporting program, and a storage medium.

2. Related Art

JP-A-2014-233814 discloses a technique that enables teaching of predetermined work by a simple operation by generating guidance information on input of parameters of force control. JP-A-2019-126894 discloses a technique that enables editing of a motion flow of work by changing a combination of motion objects showing motions of a robot.

The technique disclosed in JP-A-2014-233814 is to teach on predetermined work and improvement in general versatility is difficult. The technique disclosed in JP-A-2019-126894 may lower operability particularly for a beginner when motion objects increase for general versatility thereof.

SUMMARY

An aspect is directed to a method of supporting creation of a program for supporting creation of a program for work by a robot, including detecting an operation by a user on an input device, determining a type of the work by the operation to select the type, displaying a dedicated motion flow showing a sequence of motion of the robot corresponding to the type and containing a dedicated object showing the motion for which a change of the sequence is not allowed on a display device, and converting the dedicated object into a versatile object showing the motion for which a change of the sequence is allowed by the operation to convert the dedicated object.

Another aspect is directed to a program creation supporting apparatus supporting creation of a program for work by a robot, including an input device detecting an operation by a user, a display device displaying an image, and a control circuit determining a type of the work by the operation to select the type, displaying a dedicated motion flow showing a sequence of motion of the robot corresponding to the type and containing a dedicated object showing the motion for which a change of the sequence is not allowed on the display device, and converting the dedicated object into a versatile object showing the motion for which a change of the sequence is allowed by the operation to convert the dedicated object.

Another aspect is directed to a program creation supporting program for supporting creation of a program for work by a robot, for controlling a computer to execute processing including detecting an operation by a user on an input device, determining a type of the work by the operation to select the type, displaying a dedicated motion flow showing a sequence of motion of the robot corresponding to the type and containing a dedicated object showing the motion for which a change of the sequence is not allowed on a display device, and converting the dedicated object into a versatile object showing the motion for which a change of the sequence is allowed by the operation to convert the dedicated object.

Another aspect is directed to a non-transitory computer-readable storage medium storing the above described program creation supporting program.

DESCRIPTION OF EXEMPLARY EMBODIMENTS

As below, an embodiment of the present disclosure will be explained with reference to the drawings. In the drawings, the same or similar elements may respectively have the same or similar signs and the overlapping explanation may be omitted.

Figure 1:
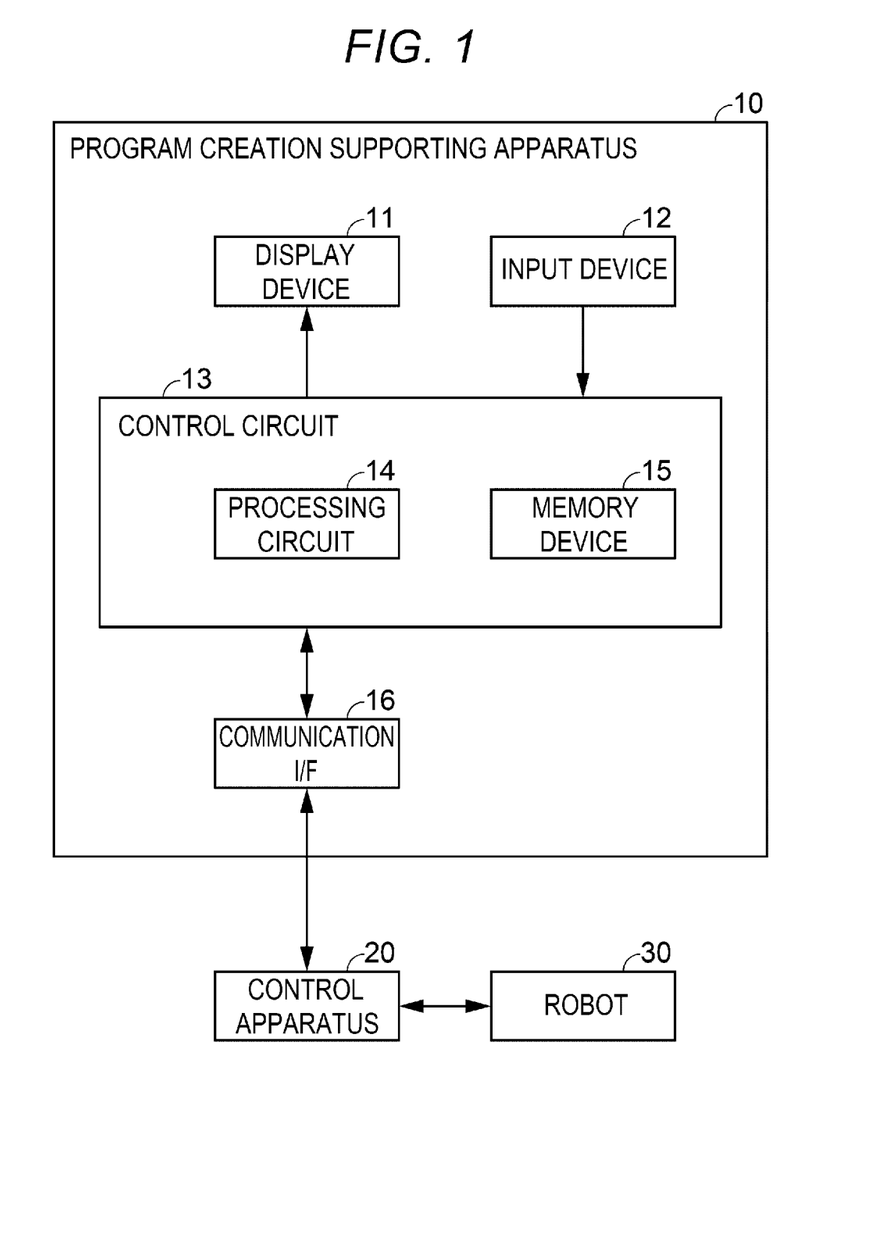
FIG. 1 is a block diagram for explanation of a basic configuration of a program creation supporting apparatus according to an embodiment.

As shown in FIG. 1, a robot system according to the embodiment includes a program creation supporting apparatus 10, a control apparatus 20, and a robot 30. The robot 30 performs work on an object by force control for controlling a force acting on the object to be a target force. The control apparatus 20 controls the robot 30 to perform work on the object according to a program. Here, the program refers to a task program for the robot 30 to perform motion and an auxiliary function for execution of an intended task. The program creation supporting apparatus 10 supports creation of a program for work by the robot 30.

The robot 30 is e.g. an articulated robot having a six-axis arm moving at six degrees of freedom. The robot 30 includes e.g. a base, a manipulator supported by the base, an end effector attached to a mechanical interface of the manipulator, and a force sensor. The manipulator of the robot 30 includes a plurality of actuators driving respective joints of the manipulator and a plurality of encoders detecting rotation angles of the respective joints. The force sensor of the robot 30 detects the force acting on the object via the end effector.

The control apparatus 20 executes the program to control the manipulator and the end effector of the robot 30 and controls the robot 30 to perform work on the object. A signal corresponding to the force acting on the object is input from the force sensor of the robot 30 to the control apparatus 20. The control apparatus 20 performs force control on the robot 30 so that the force acting on the object may be a target force defined by the program. In the embodiment, the force may refer to a load, i.e., a force and torque.

Further, the control apparatus 20 controls the robot 30 so that a pose obtained from the encoders of the robot 30 may be a target pose defined by the program. The pose refers to e.g. a position and an attitude of a tool center point (TCP). The TCP is a reference for the position of the end effector of the robot 30.

The program creation supporting apparatus 10 includes a display device 11, an input device 12, a control circuit 13, and a communication interface (I/F) 16. The program creation supporting apparatus 10 can be configured using various general-purpose computers. The respective hardware of the program creation supporting apparatus 10 may be shared with the control apparatus 20. The display device 11 displays an image according to control by the control circuit 13. As the display device 11, for example, a display device such as a liquid crystal display or an organic light emitting diode display may be employed.

The input device 12 detects an operation by a user and outputs a signal according to the operation by the user to the control circuit 13. As the input device 12, for example, various input devices including a pointing device such as a mouse, a keyboard, a push button, and a touch sensor may be employed. As the display device 11 and the input device 12 integrally formed with each other, a touch-panel display may be employed.

The control circuit 13 includes a processing circuit 14 and a memory device 15. The processing circuit 14 forms a processing unit of a computer that processes calculations necessary for operation of the program creation supporting apparatus 10. The processing circuit 14 realizes various functions of the program creation supporting apparatus 10 described in the embodiment by executing e.g. a program creation supporting program stored in the memory device 15. As a processing unit forming at least a part of the processing circuit 14, various arithmetic logic circuits including e.g. a central processing unit (CPU), a digital signal processor (DSP), a programmable logic device (PLD), and an application specific integrated circuit (ASIC) may be employed. The processing circuit 14 may be formed using integrated hardware or a plurality of separate pieces of hardware.

The memory device 15 includes a computer-readable storage medium that stores the program creation supporting program representing a series of processing necessary for operation of the program creation supporting apparatus 10 and various kinds of data. As the storage medium, e.g. a semiconductor memory or various disk media may be employed. The storage medium is not limited to a nonvolatile auxiliary storage device, but may include a volatile main storage device such as a register or a cache memory. At least a part of the storage medium may be formed using a part of the processing circuit 14. The memory device 15 may be formed using integrated hardware or a plurality of separate pieces of hardware.

The communication I/F 16 communicably connects to the control apparatus 20 by e.g. establishment of a communication link between the control apparatus 20 and itself according to the control by the processing circuit 14. The communication I/F 16 may include e.g. an antenna that transmits and receives a signal, a circuit that processes the signal transmitted in the communication link, and a receptable into which a plug of a communication cable is inserted. The communication I/F 16 transmits a program created in the program creation supporting apparatus 10 to the control apparatus 20. The communication I/F 16 may include a receptable into which a plug of an auxiliary storage device for storing the program created in the program creation supporting apparatus 10 is inserted.

Figure 2:
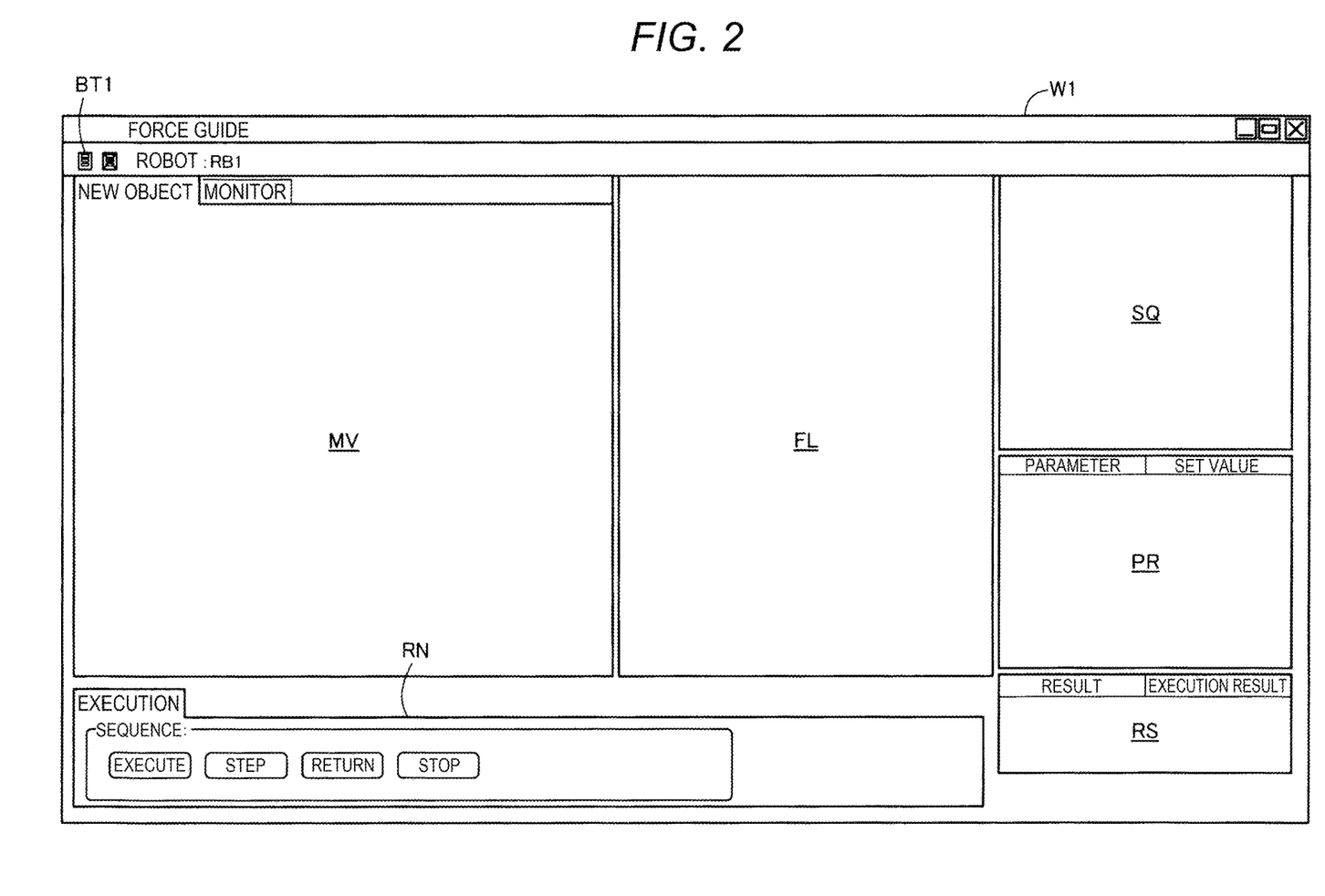
FIG. 2 is a diagram for explanation of an example of a creation window.

As shown in FIG. 2, for example, the processing circuit 14 executes the program creation supporting program and displays a creation window W1 for creation of a program for the robot 30 to perform work on the display device 11. The creation window W1 contains a main view area MV, a motion flow area FL, a sequence area SQ, a parameter area PR, a result area RS, and an execution area RN.

The main view area MV displays options of motion objects forming elements of a motion flow and an execution result of a program. The motion flow area FL displays a motion flow graphically showing a sequence of motion of the robot 30. The sequence area SQ displays a tree structure of the sequence in the motion flow. The parameter area PR displays work parameters on the entire sequence, motion parameters on individual motions, etc. The result area RS displays an execution result of the program including working time. The execution area RN displays buttons for instructions to execute the program etc.

In the example shown in FIG. 2, the plurality of areas forming the creation window W1 are divided as different frames, however, not necessarily divided in frames. The creation window W1 has a button BT1 for starting a wizard to support creation of a program in an upper left area. For example, when the button BT1 is pressed by an operation by a user on the input device 12, the processing circuit 14 displays a work select window for selection of a type of work as a part of the creation window W1 on the display device 11.

The work select window presents a plurality of types of work as options to the user. The processing circuit 14 determines the type of work according to an operation by the user to select the type of work. The types of work may include various types e.g. attachment, screwing, height check, and fitting. Further, the processing circuit 14 sets work parameters by prompting the user to input the work parameters. For example, when the type of work is screwing, the work parameters include a screw length and a rotation speed of a driver. The processing circuit 14 displays a dedicated motion flow showing a sequence of motion of the robot 30 corresponding to the determined type in the motion flow area FL. The motion flow displayed in the motion flow area FL may be edited by an operation by the user on the input device 12.

Figure 3:
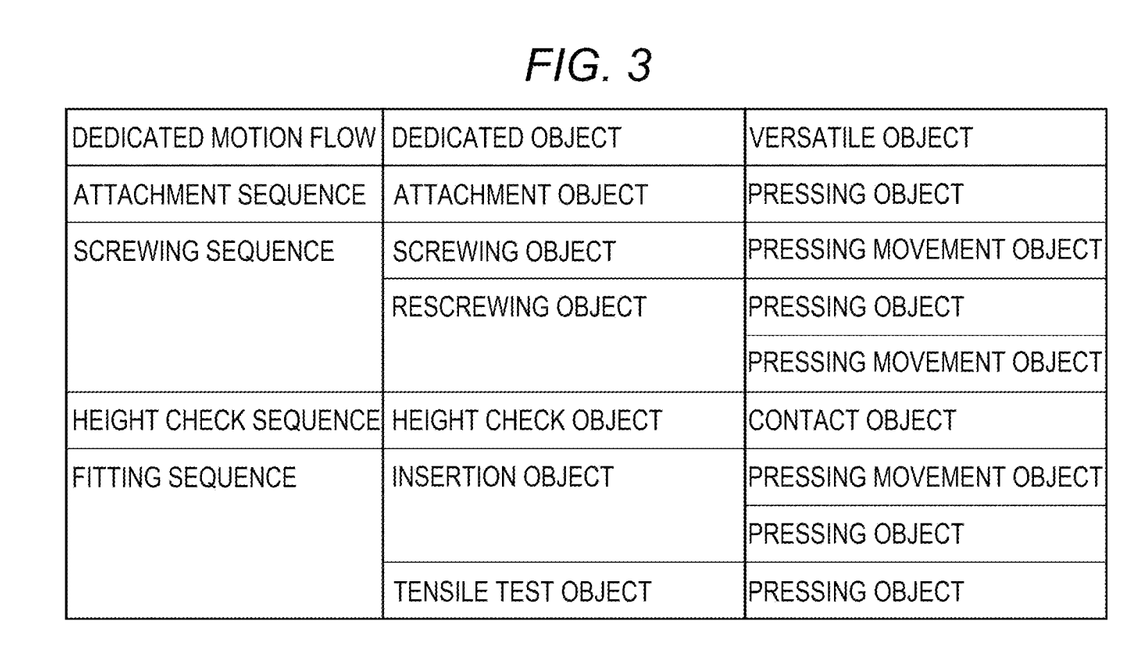
FIG. 3 is a table for explanation of correspondences between dedicated objects and versatile objects with respect to each work.

As shown in FIG. 3, the dedicated motion flow shows various kinds of sequences including an attachment sequence, a screwing sequence, a height check sequence, and a fitting sequence. Accordingly, the work select window may display a list of options corresponding to the plurality of kinds of dedicated motion flows. The dedicated motion flow is a motion flow containing a dedicated object showing motion of the robot 30 in work on a specific object. For the dedicated object, a change of the sequence is not allowed. The change of the sequence refers to addition, deletion, and movement in the sequence.

For example, the attachment sequence corresponding to work to attach an object to a predetermined position includes one dedicated object called an attachment object. The screwing sequence corresponding to work to insert and fasten a male screw into a female thread includes two dedicated objects of a screwing object and a rescrewing object. The height check sequence corresponding to work to detect the height of an object includes one dedicated object called a height check object. The fitting sequence corresponding to work to fit an object in a predetermined position includes two dedicated objects of an insertion object and a tensile test object.

Figure 4:
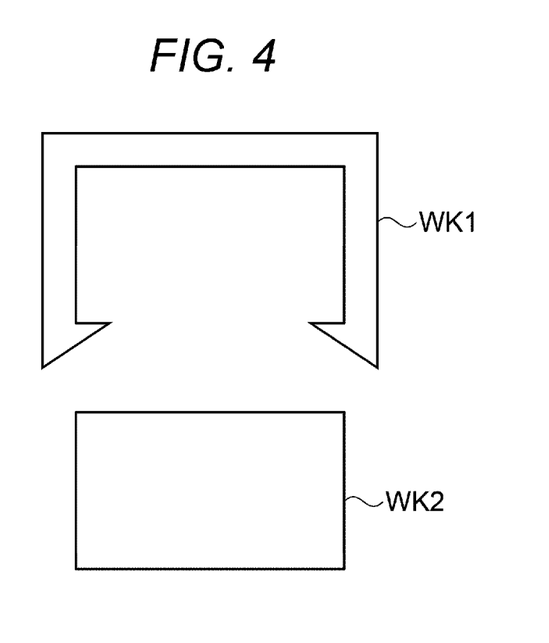
FIG. 4 is a diagram for explanation of fitting as work performed by a robot.

As below, as shown in FIG. 4, an example in which the type of work is determined to be fitting to fit an object WK1 in an object WK2 will be explained. The objects WK1 and WK2 are fitted in each other by snap fit. For example, the object WK1 is gripped by a gripper of the robot 30 and fitted in the object WK2. First, the type of work is determined to be fitting according to an operation by the user to select the type of work in the work select window. The sequence of motion corresponding to fitting is the fitting sequence.

Figure 5:
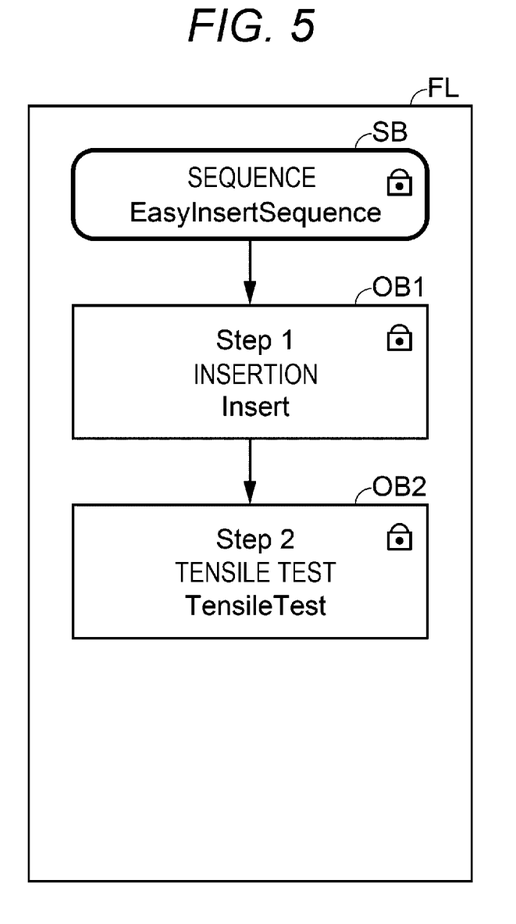
FIG. 5 is a diagram for explanation of a motion flow area for displaying a dedicated motion flow.

As shown in FIG. 5, the processing circuit 14 displays a dedicated motion flow showing the fitting sequence in the motion flow area FL according to the determination of the type of work to be fitting. In the example shown in FIG. 5, the dedicated motion flow includes a sequence block SB for description of the sequence, a first motion object OB1, and a second motion object OB2. For example, in the sequence block SB, work parameters having effects on the first motion object OB1 and the second motion object OB2 are set. The work parameters include e.g. a coordinate system, a shape of the object, a fitting direction, a fitting depth, and an approach distance. The work parameters may be set in the dedicated object.

The sequence block SB has a lock mark and a character string "EasyInsertSequence" respectively meaning that the motion flow is a dedicated motion flow. The first motion object OB1 is the dedicated object called an insertion object. The second motion object OB2 is the dedicated object called a tensile test object. The first motion object OB1 and the second motion object OB2 respectively have lock marks meaning that the change of the sequence is not allowed.

In the example shown in FIG. 5, the sequence block SB is highlighted with a thicker frame line than the respective frame lines of the first motion object OB1 and the second motion object OB2. The highlighted sequence block SB means that the sequence block SB is selected by the operation by the user on the input device 12.

Figure 6:
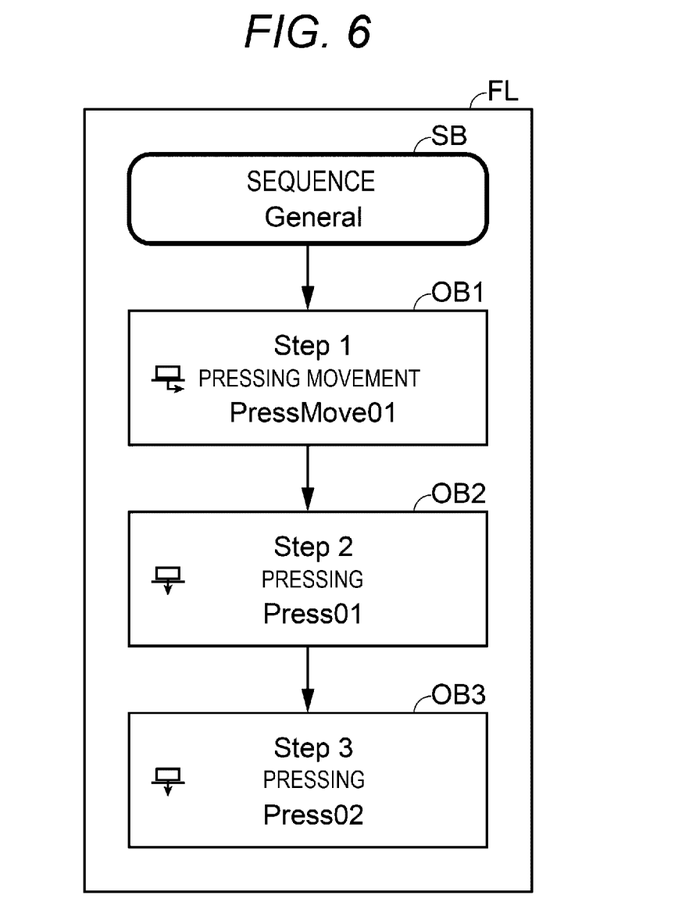
FIG. 6 is a diagram for explanation of a motion flow area for displaying a versatile motion flow.

As shown in FIG. 6, the processing circuit 14 converts the respective dedicated objects contained in the dedicated motion flow displayed in the motion flow area FL into versatile objects by a predetermined operation to convert the dedicated motion flow. For example, the processing circuit 14 displays a context menu corresponding to the selected sequence block SB on the display device 11. "Convert" contained in the context menu is selected by the user, and thereby, the processing circuit 14 converts the respective dedicated objects into versatile objects.

In the example shown in FIG. 6, a motion flow includes a sequence block SB, a first motion object OB1, a second motion object OB2, and a third motion object OB3. The sequence block SB does not have a lock mark meaning that the motion flow is a dedicated motion flow and has a character string "General" meaning that the motion flow is a versatile motion flow. The versatile motion flow is a motion flow not containing a dedicated object, but containing a versatile object. The versatile object shows the same motion as the motion shown by the dedicated object before conversion and a change of the sequence is allowed.

The first motion object OB1 is a versatile object called a pressing movement object. The pressing movement object shows motion to move while pressing in a designated direction by a designated force. The respective second motion object OB2 and third motion object OB3 are versatile objects called pressing objects. The pressing object refers to motion to press in a designated direction by a designated force.

In the example shown in FIG. 6, the first motion object OB1, the second motion object OB2, and the third motion object OB3 respectively do not have lock marks. Note that the first motion object OB1, the second motion object OB2, and the third motion object OB3 respectively have icons as images of the respective motions. The versatile object has an independent motion parameter not affected by the work parameter of the sequence block SB. For example, the motion parameter of the pressing movement object includes a coordinate system, a pressing direction, a type of movement, and a movement distance. In the motion parameter, the pressing direction may be designated by six-axis parameters. Note that the icons as the images of the respective motions may be displayed in the first motion object OB1 and the second motion object OB2 of the dedicated motion flow shown in FIG. 5.

The highlighted sequence block SB in FIG. 6 means that the respective versatile objects in the versatile motion flow are converted from the dedicated objects. As shown in FIG. 3, the insertion object in FIG. 5 corresponds to the pressing movement object and the pressing object in FIG. 6. Similarly, the tensile test object in FIG. 5 corresponds to the pressing object in FIG. 6. In FIG. 5, the work parameters set in the sequence block SB are set as motion parameters in the respective motion objects in FIG. 6.

In the fitting sequence, the robot 30 moves the object WK1 immediately before fitting in the object WK2 by the pressing movement object. That is, the robot 30 presses the object WK1 downward along the planar direction orthogonal to the downward direction in FIG. 4. Then, the robot 30 slowly presses the object WK1 downward until the force becomes steady after collision with the object WK2 by the pressing object. Then, the robot 30 presses the object WK1 upward by the pressing object, and confirms not coming out from the object WK2.

In this example, the pressing movement object as the first motion object OB1 moves the object WK1 at a higher speed than the pressing object of the second motion object OB2. Thereby, the collision force between the object WK1 and the object WK2 may be prevented from being excessively large and both high-speed fitting and reduction of the collision force are realized. The above described dedicated motion flow is prepared in advance, and thereby, for example, even when a program is created by a beginner, efficient work may be performed. Further, the program creation supporting apparatus 10 converts the dedicated object contained in the dedicated motion flow into the versatile object and the sequence can be changed. Thereby, work may be customized and the general versatility is improved.

The dedicated motion flow is e.g. an efficient motion flow, however, may be a motion flow hard for a beginner to understand or a motion flow with a sequence that should not be changed. The sequence of the motion flow containing the versatile object can be changed, however, for example, intended work may be impractical due to e.g. deletion, movement, etc. of the versatile object. To prevent that, a message warning a change of the sequence by an operation to change the sequence may be displayed on the display device 11.

Note that the work parameter of the second motion object OB2 in FIG. 5 may be determined by the work parameter of the sequence block SB or the first motion object OB1. That is, the tensile direction in the tensile test object may be an opposite direction to the fitting direction as the work parameter of the fitting sequence. Thereby, the number of set parameters is reduced and operability in program creation is improved.

Furthermore, as shown in FIG. 3, the attachment object contained in the attachment sequence is converted into the pressing object. The screwing object contained in the screwing sequence is converted into the pressing movement object, and the rescrewing object is converted into the pressing object and the pressing movement object. The height check object contained in the height check sequence is converted into a contact object. The contact object shows motion to move in a designated direction and stop when receiving a reaction force.

In addition, the versatile object may be various objects including relaxing, profile movement, surface opposing, pressing exploring, contact exploring, conditional branching, and program execution. The relaxing is motion to profile so that the force along the designated axis may be zero. The profile movement is motion to move along a designated trajectory so that the force along the designated axis may be zero. The surface opposing is motion to press along an angle in a designated direction to oppose surfaces to each other. The pressing exploring is motion to explore and find a hole in a trajectory designated while pressing. The contact exploring is motion to repeat contact motion and find a hole. The conditional branching branches the motion flow according to a result of an object as a determination object. The program execution executes a program of a designated function name.

Figure 7:
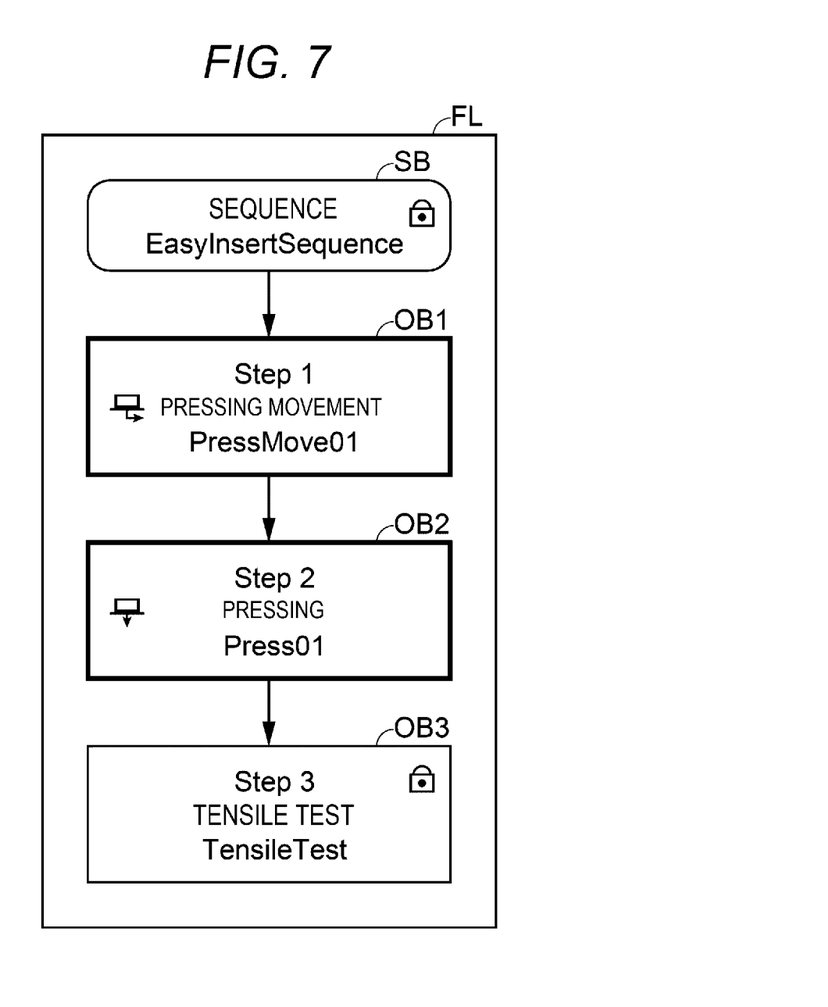
FIG. 7 is a diagram for explanation of a dedicated motion flow containing versatile objects.

Or, as shown in FIG. 7, the processing circuit 14 converts the specific dedicated object displayed in the motion flow area FL into the versatile object by a predetermined operation to convert the dedicated object. For example, in the example shown in FIG. 5, the first motion object OB1 is selected by the operation by the user and highlighted in the motion flow area FL. The processing circuit 14 displays the context menu corresponding to the selected first motion object OB1 on the display device 11. When "convert" contained in the context menu is selected by the user, the processing circuit 14 converts the respective dedicated objects into the versatile objects. Thereby, the dedicated motion flow in FIG. 7 is displayed in the motion flow area FL.

In the example shown in FIG. 7, the motion flow includes the sequence block SB, the first motion object OB1 and the second motion object OB2 respectively as the versatile objects, and the third motion object OB3 as the dedicated object. The insertion object in FIG. 5 corresponds to the pressing movement object and the pressing object in FIG. 7. The processing circuit 14 highlights the pressing movement object and the pressing object as the versatile objects converted from the insertion object. The sequence block SB or the versatile objects after conversion are highlighted, and thereby, a relationship with the motion flow before conversion may be presented to the user.

When the dedicated motion flow is converted, the motion parameter in the versatile object is carried over from the work parameter in the dedicated motion flow. For example, "coordinate system" of fitting as the work parameter in the fitting sequence is carried over as "coordinate system" of force control as the motion parameter in the versatile object. Similarly, "fitting direction" designated by one direction is converted into "pressing direction" designated by six axes and carried over. In this manner, by conversion into the versatile object, the kinds of parameters are increased and general versatility is improved.

Further, the processing circuit 14 may display a source code of a program representing the dedicated motion flow displayed in the motion flow area FL on the display device 11 according to an operation by the user to display the program in a character string. The displayed program is edited, and thereby, more detailed settings can be made. The processing circuit 14 may display a program representing the versatile motion flow displayed in the motion flow area FL on the display device 11. Furthermore, a specific motion object may be selectively converted into a program or the converted program may be replaced by an object to be executed.

Figure 8:
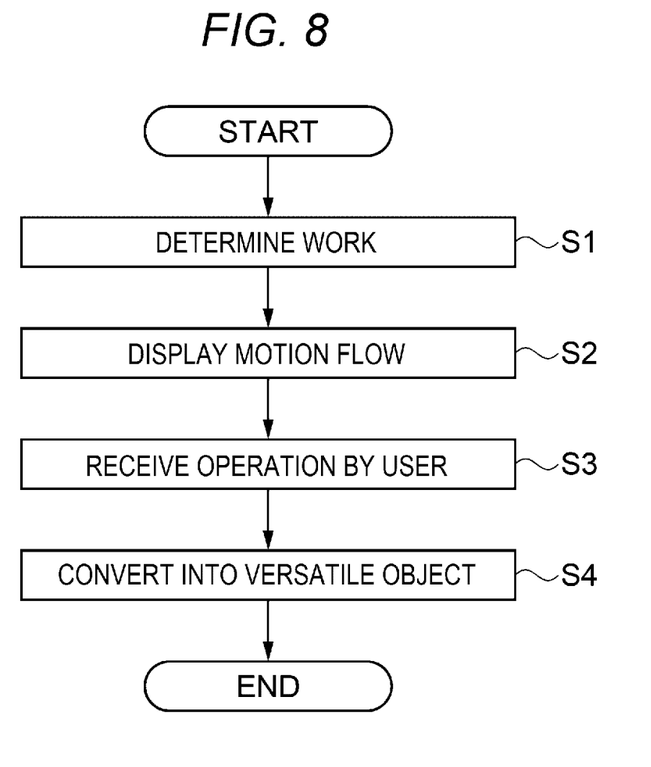
FIG. 8 is a flowchart for explanation of an example of a method of supporting creation of a program.

Referring to FIG. 8, an example of an operation of the program creation supporting apparatus 10 will be explained as a method of supporting creation of a program according to the embodiment. The series of processing including the processing shown in FIG. 8 is executed by a program creation supporting program installed in the control circuit 13.

At step S1, the processing circuit 14 displays a plurality of types of work that may be executed by the robot 30 as options to be selected by the user on the display device 11. The processing circuit 14 determines the type of work according to an operation by the user on the input device 12 to select the type of work.

At step S2, the processing circuit 14 displays a dedicated motion flow corresponding to the type determined at step S1 on the display device 11. The dedicated motion flow is an image showing a sequence of motion in the type of work determined at step S1. The dedicated motion flow contains a dedicated object as an image showing motion contained in the sequence.

At step S3, the processing circuit 14 receives an operation by the user to convert the dedicated object displayed at step S2 via the input device 12. The operation to convert the dedicated object may be an operation to convert the whole dedicated motion flow.

At step S4, the processing circuit 14 converts the dedicated object operated to convert at step S3 into a versatile object. For the versatile object, a change of the sequence is allowed, and addition, deletion, and movement in the sequence can be made.

According to the program creation supporting apparatus 10, the dedicated motion flow corresponding to the type of work is displayed and the dedicated object contained in the dedicated motion flow is converted into the versatile object. By the dedicated motion flow, for example, the sequence of motion may be determined by a simple operation for a beginner. Further, by the versatile object, for example, detailed adjustment can be made for an experienced user. Therefore, according to the program creation supporting apparatus 10, general versatility in the program creation support may be secured and operability may be improved.

The embodiment is explained as above, however, the present disclosure is not limited to these disclosures. The configurations of the respective parts may be replaced by arbitrary configurations having the same functions, or arbitrary configurations in the respective embodiments may be omitted or added within the technical scope of the present disclosure. From these disclosures, various alternative embodiments would be clear to a person skilled in the art.

For example, the dedicated object may be omitted in the motion flow area FL. In this case, motion corresponding to the dedicated object is set in the sequence block SB, and the sequence block SB may be regarded as the dedicated object. Further, the dedicated object and the versatile object may have colors and shapes different from each other for ease of distinction. The same applies to the dedicated motion flow and the versatile motion flow.

The present disclosure obviously includes other various embodiments such as configurations in which the above described respective configurations are mutually applied, not described as above. The technical scope of the present disclosure is defined only by the matters used to specify the invention according to claims appropriate from the above description.

What is claimed is:

1. A method of supporting creation of a program for supporting creation of a program for work by a robot, the method comprising:
   detecting an operation by a user on an input device;
   determining a type of the work by the operation to select the type;
   displaying a dedicated motion flow showing a sequence of motion of the robot corresponding to the type and containing a dedicated object showing the motion for which a change of the sequence of the motion of the robot is not allowed on a display device; and
   converting the dedicated object into a versatile object showing the motion for which a change of the sequence of the motion of the robot is allowed by the operation to convert the dedicated object.

2. The method of supporting creation of the program according to claim 1, wherein
   the respective dedicated objects contained in the dedicated motion flow are converted into the versatile objects by the operation to convert the dedicated flow.

3. The method of supporting creation of the program according to claim 1, wherein
   the converted versatile object is highlighted and displayed on the display device.

4. The method of supporting creation of the program according to claim 1, wherein
   a message warning a change of the sequence is displayed on the display device by the operation to change the sequence.

5. The method of supporting creation of the program according to claim 1, wherein
   a source code of the program representing the dedicated motion flow is displayed on the display device.

6. A program creation supporting apparatus supporting creation of a program for work by a robot, the apparatus comprising:
   an input device detecting an operation by a user;
   a display device displaying an image; and
   a control circuit determining a type of the work by the operation to select the type, displaying a dedicated motion flow showing a sequence of motion of the robot corresponding to the type and containing a dedicated object showing the motion for which a change of the sequence of the motion of the robot is not allowed on the display device, and converting the dedicated object into a versatile object showing the motion for which a change of the sequence of the motion of the robot is allowed by the operation to convert the dedicated object.

7. A non-transitory computer-readable storage medium storing a program creation supporting program for supporting creation of a program for work by a robot, the program for controlling a computer to execute processing comprising:
   detecting an operation by a user on an input device;
   determining a type of the work by the operation to select the type;
   displaying a dedicated motion flow showing a sequence of motion of the robot corresponding to the type and containing a dedicated object showing the motion for which a change of the sequence of the motion of the robot is not allowed on a display device; and
   converting the dedicated object into a versatile object showing the motion for which a change of the sequence of the motion of the robot is allowed by the operation to convert the dedicated object.

* * * * *